US006462104B1

United States Patent
Canpont et al.

(10) Patent No.: US 6,462,104 B1
(45) Date of Patent: Oct. 8, 2002

(54) PROCESS FOR PREPARING A SILICA SUSPENSION IN A SILICONE MATRIX CROSSLINKABLE BY POLYCONDENSATION TO FORM ELASTOMERS

(75) Inventors: Dominique Canpont, Oullins; Fabienne Howe, Caluire; Alain Pouchelon, Meyzieu, all of (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 0 days.

(21) Appl. No.: 09/868,383

(22) PCT Filed: Dec. 21, 1999

(86) PCT No.: PCT/FR99/03212

§ 371 (c)(1),
(2), (4) Date: Aug. 27, 2001

(87) PCT Pub. No.: WO00/37549

PCT Pub. Date: Jun. 29, 2000

(30) Foreign Application Priority Data

Dec. 22, 1998 (FR) .......................................... 98 16467

(51) Int. Cl.$^7$ ................................................. C08K 9/06
(52) U.S. Cl. ........................ 523/213; 523/212; 524/588
(58) Field of Search ................................. 523/213, 212; 524/588

(56) References Cited

U.S. PATENT DOCUMENTS 4,785,047 A * 11/1988 Jensen ........................ 524/714
5,504,147 A * 4/1996 Fujiki et al. ................. 524/730
6,391,944 B2 * 5/2002 Canpont et al. ............. 523/212

FOREIGN PATENT DOCUMENTS

GB        2 287 248       9/1995       ........... C08L/83/04

* cited by examiner

Primary Examiner—Margaret G. Moore

(57) ABSTRACT

The invention concerns a method for preparing a silica suspension in a silicone matrix, said suspension capable of being used for producing organopolysiloxanes crosslinkable by polycondensation. The invention aims at seeking a technical compromise between the rheology of said compositions and the mechanical properties of the resulting crosslinked elastomers. As a solution, the invention discloses a method for preparing a silica suspension treated with organosilazane in a silicone material comprising a linear reactive polyorganosiloxane bearing for example at each chain end a hydroxy group. The invention is characterized in that it consists essentially in introducing the organosilozane in the preparation medium: before and/or substantially simultaneously before bringing together at least part of the silicone material and the particulate filler used, said organosilozane introduction being carried out with a fraction of organosilazane corresponding to a proportion ranging between 8% and 30% by dry weight relatively to the silica filler, and after bringing together the filler and all or part of the silicone material.

12 Claims, No Drawings

PROCESS FOR PREPARING A SILICA SUSPENSION IN A SILICONE MATRIX CROSSLINKABLE BY POLYCONDENSATION TO FORM ELASTOMERS

This application is an application under 35 U.S.C. Section 371 of International Application Number PCT/FR99/03212 filed on Dec. 21, 1999.

The field of the invention is that of polyorganosiloxane compositions which may be vulcanized cured into silicone elastomers by polycondensation actions, the main components of which are one or more reactive polyorganosiloxane (s) and fillers.

More specifically, the present invention elates to the preparation of an intermediate product which is useful in obtaining these silicone elastomers and which consists of a suspension of reinforcing filler in at least one reactive polyorganosiloxane bearing condensable or hydrolyzable functions, such as, for example, $\equiv$Si—OH, which are capable of reacting together and/or with a vulcanizing agent chosen from organosilicon compounds bearing more than two condensable or hydrolyzable functions. The present invention also relates to the preparation of polyorganosiloxane compositions which may be vulcanized or cured into silicone elastomers by polycondensation reactions, comprising said reinforcing filler suspension as constituent element.

Reinforcing and non-reinforcing fillers are distinguished in silicone elastomers.

The reinforcing fillers most commonly used are pyrogenic silicas and precipitated silicas with a BET surface>40 $m^2/g$. These are ultrafine powders which owe their reinforcing effect firstly to their morphology and secondly to the hydrogen bonds which form between the silanol groups on the surface of the silicas (3–6 SiOH groups/$nm^2$) and the polyorganosiloxane (POS) chains. These interactions between the filler and the polymer increase the viscosity and modify the behavior of the polymer in the region of the solid surface of the fillers. Moreover, the bonds between polymers and fillers improve the mechanical properties, but may also cause a harmful premature curing ("structuring") of the elastomer-precursor compositions.

Non-reinforcing fillers have an extremely weak interaction with silicone polymer. These fillers are, for example, chalk, quartz powder, diatomaceous earth, mica, kaolin, aluminas and iron oxides. Their effect is often to increase the viscosity of the non-vulcanized precursors of the elastomers, and also the Shore hardness and the modulus of elasticity of these elastomers.

Compositions capable of giving silicone elastomers also contain catalysts, vulcanizing agents and optionally pigments, antiblocking agents, plasticizers and/or adhesion promoters.

These polycondensation-vulcanizable elastomers, also known as polycondensation RTV elastomers, are formed before vulcanization by casting, extrusion, calendaring, or compression-, injection- or transfer-molding.

Silicone compositions which may be vulcanized or cured into elastomers by polycondensation at room temperature or at higher temperatures (generally<100° C.) are conventionally packaged in the form of one-component systems (i.e. systems comprising only one packaging) or two-component systems (i.e. systems comprising two parts packaged separately and needing to be mixed together at the time of use).

In the two-component systems, one of the components comprises the polycondensation reaction catalyst. This catalyst may be a metal compound such as, for example, an organotin compound. This component comprising the catalyst may also comprise the vulcanizing agent.

Such compositions may also be in the form of one-component systems which vulcanize at and above room temperature in the presence of water.

The preparation of concentrated suspensions (slurries) of reinforcing silicas in reactive silicone oils which are intended to produce polycondensation-vulcanized elastomers poses problems of mixing the pulverulent filler with the oil, and care must be taken particularly to obtain a uniform distribution of the fillers in the suspension.

Another difficulty to be overcome is associated with the rheology of the suspensions prepared. Specifically, it is clear that the introduction of a pulverulent particulate filler of very small particle size into silicone oil necessarily induces an appreciable increase in viscosity. Now, this characteristic, although accompanying the production of good mechanical properties for vulcanized silicone elastomers comprising the suspension as starting material, is harmful to the handling and forming of the suspension and of the silicone compositions containing it. Specifically, it is more convenient, for molding, extrusion or forming, to work with fluid compositions which are easier to pump, flow or mix with functional additives, inter alia.

The problem considered herein may thus be summarized as the search for a technical compromise between specifications, which are in principle antinomic, for suspensions of fine particulate fillers in silicone oils, namely: (i) the fineness of distribution of the particles in the silicone matrix; (ii) the adaptation of the rheology of the suspension to the handling constraints, and (iii) the level of the mechanical properties of the vulcanized silicone elastomers.

Document FR-A-2 717 180 addresses this problem and discloses a process for preparing two-component filled compositions, which may be vulcanized into elastomers by polycondensation reactions, the characteristic of which lies in the fact that the filler used, which is usually a siliceous filler, and which is mixed with the reactive POS bearing condensable functions, is treated with a compatibilizer, in particular of silazane type, before being incorporated into the composition, this treatment being imperatively and exclusively performed in an unreactive POS, in particular a polydialkylsiloxane containing trialkylsilane end groups. This mode of treatment may be carried out in two stages, by first mixing the unreactive POS and the filler with a fraction of the treatment agent and, after homogenizing this first mixture, incorporating the remaining treatment agent therein. This mode of treatment gives relatively fluid filler suspensions, but the Applicant is of the opinion that it is not without adverse consequences on the elastomers prepared from compositions comprising this suspension: specifically, there is a fear that the unreactive POS, which is not bound to the surface of the silica and, consequently, is poorly attached to the silicone network created during the vulcanization, may exude from the elastomeric articles made.

In such a technical context, one of the essential objects of the present invention is to provide a process for preparing a suspension of a particulate filler treated with a compatibilizer, in a silicone oil, this suspension being potentially useful as a starting material for producing compositions which may be vulcanized or cured by polycondensation reactions into polycondensation RTV elastomer, said process needing to satisfy the following specifications:

uniformity and homogeneity of the distribution of the filler in the silicone oil, optimization of the dispersion, suspension which flows well (with no flow threshold) and viscosity suitable for handling and converting the suspension, good stability on storage (flowability, viscosity, setting time) of curable compositions comprising the suspension, elastomers with mechanical properties (in particular elongation at break and tear strength) of an acceptable level. Another essential object Qf the invention is to provide a process for preparing a reinforcing filler/silicone oil suspension for polycondensation RTV elastomers, which is simple to use, economical and applicable on an industrial scale.

Another essential object of the invention is to provide a process for obtaining a silicone composition which may be vulcanized or cured by polycondensation, comprising the suspension as obtained by the process intended above as constituent element, having good stability on storage and giving elastomers with mechanical properties of an acceptable level, whether this composition is in the form of a one-component composition or in the form of a two-component composition.

These objects, inter alia, are achieved by the present invention, which relates to a process for preparing a suspension of a particulate reinforcing filler, preferably of siliceous nature, in a silicone material (SM):

+ said SM comprising:

at least one linear reactive POS bearing at each chain end at least two condensable groups (other than OH) or hydrolyzable groups, or a single hydroxyl group, optionally at least one linear unreactive POS not bearing a condensable, hydrolyzable or hydroxyl group, optionally water, + said suspension being usable in particular to produce silicone compositions which may be vulcanized or cured by polycondensation, + said process being of the type in which the particulate reinforcing filler is treated with a compatibilizer (CA), and being characterized in that it consists essentially in introducing the compatibilizer (CA) into the medium for preparing the suspension:

firstly, before and/or substantially simultaneously with the incorporation, into at least a portion of the SM silicone material used, of the particulate reinforcing filler used, this introduction of CA being carried out with a fraction of CA corresponding to a proportion within the range from 8% to 30% by dry weight relative to the particulate reinforcing filler; and secondly, after this incorporation of the filler into at least a portion of the SM.

After considerable research and experimentation, the inventors have demonstrated, to their credit, that the compatibilizer (such as, for example, hexamethyldisilazane, known as HMDZ) should, entirely surprisingly and unexpectedly, be introduced before and after the incorporation of the reinforcing filler into at least a portion of the SM silicone material, with the condition according to which the fraction of compatibilizer AC introduced before the incorporation of the filler represents from 8% to 30% by weight of the reinforcing filler used.

These novel and advantageous methods make it possible to obtain suspensions that have suitable Theological qualities and suitable viscoelastic behavior. Specifically, these suspensions have no flow threshold or a very low threshold, which is not harmful to the applications. This weighs considerably in favor of their use. In particular, their fluidity is stable over time and is suitable for the handling and conversion operations, such as pumping, conveying, mixing, forming, molding, extruding, etc.

One of the major factors in favor of the invention is that this rheological advantage does not exist at the expense of the final mechanical properties of the vulcanized elastomer. The technical compromise is achieved.

Moreover, the methodology selected makes it possible to obtain homogeneous disperseions of the particulate reinforcing filler in the SM. Furthermore, this methodology does not significantly complicate the process, which remains simple to carry out and inexpensive.

The particulate reinforcing filler usually used consists of a siliceous filler. Examples of siliceous fillers which may be suitable for use include any precipitated or pyrogenic silica known to those skilled in the art. Needless to say, fractions of different silicas may also be used.

Precipitated silicas and/or pyrogenic silicas with a BET specific surface of greater than 40 $m^2/g$ and more specifically between 50 and 300 $m^2/g$ are preferred. Pyrogenic silicas having the specific surface characteristics mentioned above are more preferably used. Even more preferably, pyrogenic silicas with a BET specific surface of between 170 and 230 $m^2/g$ are used. This reinforcing filler generally has a mean particle size of less than 0.1 $\mu$m.

The compatibilizer (CA) is chosen from organosilazanes and cycloorganosilazanes, which are liquid at a temperature of 23° C. and at a pressure of 1 010.8×$10^2$ Pa, these compounds being used alone or as a mixture. They may be compounds such as hexamethyldisilazane, 1,3-divinyl-1,1,3,3-tetramethyldisilazane, hexamethylcyclotrisilazane or octamethylcyclotetrasilazane and mixtures of these compounds. Hexamethyldisilazane is preferred.

In accordance with one of these preferred embodiments, the process according to the invention comprises the following steps:

the following are mixed together in any order, optionally by preparing a premix of the POS(s) with the compatibilizer CA and optionally the water:

(100-v-w) parts by weight of at least one reactive POS and optionally of at least one unreactive POS, 0 to 5 parts by weight of water, 10 to 50 parts by weight of particulate reinforcing filler, and a first fraction of CA representing 8% to 30% and preferably 10% to 25% of the dry weight of the reinforcing filler;

a second fraction of CA representing 2% to 25% and preferably 5% to 20% of the dry weight of the reinforcing filler is introduced into the mixture;

the mixture is left to react, with continued mixing;

the mixture is heated, choosing a pressure/temperature couple such that a devolatilization of the volatile elements and of at least some of the water which may be present takes place;

the devolatilized mixture is optionally left to cool; and the suspension is optionally completed with the rest of the reactive POS(s) (v parts by weight) and/or, optionally, with the rest of the unreactive POS(s) (w parts by weight);

said process comprising the additional defining elements listed below:

the amount of the unreactive POS(s), when this/these is (are) used, is within the range from 1 to 100 parts by weight and preferably 30 to 80 parts by weight per 100 parts of the reactive POS(s);

the total amount of pompatibilizer CA is between 10% and 45% of the weight of the reinforcing filler and preferably between 15% and 40%;

the symbol v ranges from zero to 60 parts by weight and preferably from zero to 50 parts by weight;

the symbol w ranges from zero to 50 parts by weight and preferably from zero to 40 parts by weight;

the sum v+w ranges from zero to 60 parts by weight and preferably from zero to 50 parts by weight.

In other words, the process according to the invention makes it possible to gain access to control of the viscosity of the suspension while at the same time maintaining an acceptable level for (or even improving) the mechanical properties of the final elastomer obtained using the suspension.

The mixing operations are carried out using known and suitable devices. These may be, for example:

arm mixers internal mixers planetary mixers ploughshare mixers co-rotating or counter-rotating twin-shaft mixers continuous extruder-mixers or other continuous or batch devices.

The mixing operations are carried out at normal temperature and pressure and preferably under an inert atmosphere (for example under $N_2$). Under these conditions, the POSs used and also the compatibilizer should be in liquid form to make the mixing easy.

The particulate reinforcing filler represents from 8% to 40% by weight of the suspension. In practice, this filler is of the order of 28±10%.

In order to define more specifically, without, however, this being limiting, the preferred embodiment of the process according to the invention, it may be pointed out that this process comprises, in a first variant, the following steps:

-1- a mixture comprising all or some of the silicone oil, the water and the first fraction of CA is homogenized, -2- the particulate reinforcing filler is gradually added to the mixture obtained in 1, -3- mixing is continued without heating, -4- the second fraction of CA is gradually incorporated into the mixture obtained in 3, -5- mixing is continued without heating, -6- the mixture is devolatilized, preferably by heating to a temperature $\geq 100°$ C. at a pressure below atmospheric pressure or by flushing with an inert gas such as, for example, nitrogen, -7- the devolatilized mixture is optionally left to cool, and -8- the suspension is optionally completed with the rest of the silicone oil.

In step 1 of the first variant, as in step 1' of the second variant described below, the expression "all or some of the silicone oil" is intended to define the following three alternatives, inter alia:

i) either all of the reactive POS(s) and optionally all of the unreactive POS(s) are used, ii) or some of the reactive POS(s) and optionally all of the unreactive POS(s) are used, (iii) or some of the reactive POS(s) and optionally some of the unreactive POS(s) are used.

According to the second variant of the preferred embodiment of the process according to the invention, this process comprises the following steps:

-1- a mixture comprising all or some of the silicone oil and the water is homogenized, -2- the particulate reinforcing filler and the first fraction of CA are simultaneously gradually incorporated into the mixture obtained in 1', -3- mixing is continued without heating, -4- the second fraction of CA, is gradually incorporated into the mixture obtained in 3, -5- mixing is continued without heating, -6- the mixture is devolatilized, preferably by heating to a temperature $\geq 100°$ C. at a pressure below atmospheric pressure or by flushing with an inert gas such as, for example, nitrogen, -7- the devolatilized mixture is optionally left to cool, and -8- the suspension is optionally completed with the rest of the silicone oil.

The characteristic of this second variant is associated with the fact that the particulate reinforcing filler and the first fraction of its compatibilizer are co-added. It may thus be envisaged to prepare a premix of these two constituents or alternatively to introduce them concomitantly.

According to a third variant of the preferred embodiment of the process according to the invention, which corresponds to the very preferential embodiment, said process comprises the following steps:

-1- a mixture comprising some of the reactive POS(s), all of the unreactive POS(s), the water and the first fraction of CA is homogenized, -2- the particulate reinforcing filler is gradually is added to the mixture obtained in 1", -3- mixing is continued without heating, -4- the second fraction of CA is gradually incorporated into the mixture obtained in 3, -5- mixing is continued without heating, -6- the mixture is devolatilized, preferably by heating to a temperature $\geq 100°$ C. at a pressure below atmospheric pressure or by flushing with an inert gas such as, for example, nitrogen, -7- the devolatilized mixture is optionally left to cool, and -8- the suspension is completed with the rest of the reactive POS(s) (in this variant: the symbol w defined above is equal to zero and the symbol v defined above is other than zero and $\leq 60$ parts by weight and preferably $\leq 50$ parts by weight).

In order to define in another way the total amount of CA used in the preferred method in which the reinforcing filler is silica and the agent CA is HMDZ, it may be pointed out that this total amount of HMDZ is sufficient to use at least one mole of HMDZ per mole of SiOH group located at the surface of the silica.

As regards the polyorganosiloxanes (POSs) used in the process of the invention, linear POSs will generally be selected.

As regards the reactive POSs, these will be oils corresponding to formula (1) below:

$$Y_nR_{3-n}SiO\text{---}[R_2SiO]_x\text{---}SiR_{3-n}Y_n \qquad (1)$$

in which:

+ R represents identical or different monovalent hydrocarbon-based radicals, and Y represents identical or different hydrolyzable or condensable groups (other than OH), or a hydroxyl group,
+ n is chosen from 1, 2 and 3 with n=1 when Y is a hydroxyl, and x has a value which is sufficient to give the oils of formula (1) a dynamic viscosity at 25° C. of between 1 000 and 20 0000 mPa·s and preferably between 5 000 and 80 000 mPa·s.

Examples of radicals R which may be mentioned include alkyl radicals containing from 1 to 8 carbon atoms, such as methyl, ethyl, propyl, butyl, hexyl and octyl, and phenyl radicals.

Examples of substituted radicals R which may be mentioned include 3,3,3-trifluoropropyl, chlorophenyl and β-cyanoethyl radicals.

As illustrations of units represented by the formula $R_2SiO$, mention may be made of those of formulae: $(CH_3)_2SiO$; $CH_3(C_6H_5)SiO$; $(C_6H_5)_2SiO$; $CF_3CH_2CH_2(CH_3)SiO$; $NC-CH_2CH_2(CH_3)SiO$.

In the products of formula (1) generally used industrially, at least 80% in numerical terms of the radicals R are methyl radicals, and the other radicals may generally be phenyl radicals.

Examples of hydrolyzable groups Y which may be mentioned include amino, acylamino, aminoxy, cetiminoxy, iminoxy, enoxy, alkoxy, alkoxy-alkylenoxy, acyloxy and phosphato groups and, for example, among these:

for the amino groups Y: n-butylamino, sec-butylamino and cyclohexylamino groups, for the N-substituted acylamino groups: the benzoylamino group, for the aminoxy groups: dimethylaminoxy, diethylaminoxy, dioctylaminoxy and diphenylaminoxy groups, for the iminoxy and cetiminoxy groups: those derived from acetophenone oxime, acetone oxime, benzophenone oxime, methyl ethyl ketoxime, diisopropyl ketoxime and chlorocyclohexanone oxime, for the alkoxy groups Y: groups containing from 1 to 8 carbon atoms, such as methoxy, propoxy, isopropoxy, butoxy, hexyloxy and octyloxy groups, for the alkoxy-alkylenoxy groups Y: the methoxy-ethylenoxy group, for the acyloxy groups Y: groups containing from 1 to 8 carbon atoms, such as formyloxy, acetoxy, propionyloxy and 2-ethylhexanoyloxy groups, for the phosphato groups ,Y: those derived from dimethyl phosphate, diethyl phosphate and dibutyl phosphate groups.

Condensable groups Y which may be mentioned include hydrogen atoms and halogen atoms, preferably chlorine.

The reactive POSs preferably used are α,ω-dihydroxylated polydiorganosiloxanes of formula (1) in which Y=OH, n=1 and x has a value which is sufficient to give the polymers a dynamic viscosity at 25° C. of between 1 000 and 200 000 mPa·s and preferably between 5 000 and 80 000; mpa·s.

As regards the unreactive POSs, these will be oils corresponding to formula (2) below:

(2)

in which the substituents R, which may be identical or different, have the same general or specific meanings as those given above for the reactive POSs of formula (1), and the symbol y has a value which is sufficient to give the polymers a dynamic viscosity at 25° C. of between 10 and 10 000 mpas and preferably between 30 and 2 000 mpa·s.

It should be understood that, in the context of the present invention, the hydroxylated POSs of formula (1) which may be used are a mixture consisting of several hydroxylated polymers which differ from each other by the value of the viscosity and/or the nature of the substituents linked to the silicon atoms. It should furthermore be pointed but that the hydroxylated polymers of formula (1) may optionally comprise, along with the units D of formula $R_2SiO$, units T of formula $RSiO_{3/2}$ and/or $SiO_2$ units in a proportion of not more than 1% (these percentages being the number of units T and/or Q per 100 silicon atoms). The same comments apply to the unreactive POSs of formula (2).

The suspension of a reinforcing filler in a silicone material SM prepared in accordance with the invention is intended to be used in the production of liquid or pasty silicone compositions, which may be vulcanized or cured by polycondensation into polycondensation RTV silicone elastomer in ambient atmosphere at normal temperature or at higher temperature.

Thus, according to another of these aspects, the present invention relates to a process for obtaining a polyorganosiloxane composition which may be vulcanized or cured by polycondensation, characterized in that it consists in mixing together the following products:

-A- the suspension as prepared according to the process defined above;
-B- optionally one or more semi-reinforcing, non. reinforcing or bulking filler(s);
-C- optionally water;
-D- optionally one or more linear reactive POS(s) bearing, at each chain end, at least two condensable or hydrolyzable groups, or a single hydroxyl group, for instance the reactive POSs of formula (1) as defined above;
-E- optionally one or more reactive POS(s) of formula (1) in which x has a value which is sufficient to give the polymers a dynamic viscosity at 25° C. of between 30 and 500 mPa·s and preferably between 35 and 100 mPa·s;
-F- optionally one or more unreactive linear POS(s) bearing no condensable hydrolyzable or hydroxyl group, for instance the unreactive POSs of formula (2) as defined above;
-G- one or more vulcanizing agent(s) chosen from:
a silane of general formula:

(3)

in which:
the substituents R, which may be identical or different, have the same general or specific meanings as those given above in formula (1),
the symbols Y', which may be identical or different, represent the same hydrolyzable or condensable groups as those mentioned above with respect to the groups Y of formula (1),
the products of partial hydrolysis of a silane of formula (3), said ingredient G being obligatory when the reactive POS(s) is(are) α,ω-dihydroxylated POSs, and optional (but desirable) when the reactive POS(s) bear at each chain end condensable groups (other than OH) or hydrolyzable groups;
-H- a polycondensation vulcanization or curing catalyst;
-I- optionally one or more additive(s) chosen from pigments, plasticizers, other rheology modifiers, stabilizers and/or adhesion promoters.

As regards the fillers B, they generally have a particle diameter of greater than 0.1 μm and are preferably chosen from ground quartz, zirconates, calcined clays, diatomaceous earths, calcium carbonate and aluminas. From 0 to 60 parts by weight and preferably from 10 to 50 parts by weight of filler(s) B per 100 parts by weight of the total amount of reactive POS(s) (POS of the suspension+ingredients D and E) are used.

As regards the water C, the amount used ranges from 0 to 2 parts by weight and preferably from 0 to 1 part by weight per 100 parts by weight of the total amount of reactive POS(s). This supply of water is not necessary if there is a sufficient amount contained in the suspension of reinforcing filler.

As regards the reactive POSs D, when they are used, the amount used represents 20% to 70% and preferably 30% to 60% of the weight of the total amount of reactive POS(s).

As regards the low-viscosity reactive POSs E, the amount used represents 0% to 10% and preferably 0.5% to 5% of the weight of the total amount of reactive POS(s).

As regards the unreactive low-viscosity POSs F, the amount used represents 0 to 40 parts by weight and preferably from 0 to 30 parts by weight per 100 parts by weight of the total amount of reactive POS(s).

As examples of silane monomers G, mention may be made more particularly of polyacyloxysilanes, polyalkoxysilanes, polyketiminoxysilanes and polyiminoxysilanes, and in particular the following silanes:
$CH_3Si(OCOCH_3)_3$; $C_2H_5Si(OCOCH_3)_3$;
$(CH_2=CH)Si(OCOCH_3)_3$; $C_6H_5Si(OCOCH_3)_3$;
$CF_3CH_2CH_2Si(OCOCH_3)_3$;
$NC-CH_2CH_2Si(OCOCH_3)_3$; $CH_2ClSi(OCOCH_2CH_3)_3$;
$CH_3Si[ON=C(CH_3)C_2H_5]_2(OCH_2CH_2OCH_3)$;
$CH_3Si[ON=CH-(CH_3)_2]_2(OCH_2CH_2OCH_3)$;
$Si(OC_2H_5)_4$; $Si(O-n-C_3H_7)_4$; $Si(O-isoC_3H_7)_4$; $Si(OC_2H_4OCH_3)_4$;
$CH_3Si(OCH_3)_3$; $CH_2=CHSi(OCH_3)_3$; $CH_3Si(OC_2H_4OCH_3)_3$;
$ClCH_2Si(OC_2H_5)_3$; $CH_2=CHSi(OC_2H_4OCH_3)_3$.

The products of partial hydrolysis, for example polyalkoxysilanes, usually referred to as polyalkyl silicates, are well-known products. The product most commonly used is polyethyl silicate 400 obtained from the partial hydrolysis of $Si(OC_2H_5)_4$.

The vulcanizing agents G preferably used in the case of the preferred use of α,ω-dihydroxylated POSs of formula (1) are alkyltrialkoxysilanes and tetraalkoxysilanes of formula (3) in which R represents an alkyl radical containing from 1 to 4 carbon atoms, and the products of partial hydrolysis of these preferred silanes.

When at least one vulcanizing agent G is used, the amount is generally between 0.5 and 20 parts by weight and preferably between 1 and 10 parts by weight per 100 parts by weight of the total amount of reactive POS(s).

The silicone compositions which may be polycondensation-vulcanized into elastomer are generally suitable from 0.01 to 10 parts by weight of catalyst H and preferably from 0.001 to 5 parts by weight of catalyst H per 100 parts by weight of the total amount of reactive POS(s).

According to a first variant of the process for obtaining a silicone composition which may be vulcanized or cured by polycondensation into elastomer, a one-component composition (i.e. a composition with only one packaging) is produced which is intended to vulcanize in the presence of moisture, in particular of moisture supplied by the ambient air or by the water present in and/or added to the composition, at room temperature and/or due to the effect of the temperature which may range, for example, from 25° C. to a value below 100° C. In this case, the vulcanization catalyst H used is a metal catalyst which is preferably chosen from tin monocarboxylates, diorganotin dicarboxylates, a tin chelate of valency IV, a hexacoordinate tin chelate of valency IV, an organotitanium derivative and an organozirconium derivative. The content of catalyst in the one-component compositions is generally between 0.001 and 0.1 part by weight per 100 parts by weight of the total amount of reactive POS(s).

According to a second variant of the process for preparing compositions which may be vulcanized into elastomers:
 each composition is produced in the form of a two-component system (or system with two packagings) C1 and C2, intended to be placed in contact with each other to give a polycondensation RTV elastomer, and
 the process is carried out such that only one of the parts C1 or C2 contains the catalyst H and optionally the vulcanizing agent(s) G.

In the case of the two-component compositions, the catalyst H used is preferably an organotin derivative as defined above, an amine or a mixture of these two species. The catalyst content of the two-component compositions is generally between 0.1 and 5 parts by weight per 100 parts by weight of the total amount of reactive POS(s).

The examples which follow illustrate:
 the preparation of suspensions of reinforcing filler in a silicone material, in accordance with the invention,
 the application of these suspensions as starting materials for obtaining two-component compositions which may be vulcanized into polycondensation RTV silicone elastomers, and
 the evaluation of the viscoelastic properties of the suspensions and the mechanical properties of the vulcanized elastomers obtained from said suspensions.

EXAMPLES

Example 1

1) Preparation of a suspension according to the invention, with introduction of the compatibilizer before and after incorporating the reinforcing filler.

The following are introduced at room temperature (23° C.), in the order shown, into a 1.5 liter arm mixer:
 351 g of unreactive POS in the form of a polydimethylsiloxane oil blocked at each of the chain ends with a $(CH_3)_3SiO_{1/2}$ unit having a viscosity of 50 mpa·s at 25° C.,
 143 g of reactive POS in the form of a hydroxylated polydimethylsiloxane oil blocked at each of the chain ends with a $(CH_3)_2(OH)SiO_{1/2}$ unit having a viscosity of 20 000 mpa·s at 25° C. and containing 0.0527% by weight of hydroxyl radicals,
 22 g of water, and
 55 g of hexamethyldisilazane.

After homogenization, carried out at the end of 30 minutes, 338 g of a pyrogenic silica characterized by its BET specific surface of 200 m²/g are added portionwise over 180 minutes.

Mixing is continued with stirring, without heating, for 60 minutes and, at the end of this period, a further 33 g of hexamethyldisilazane are added.

Mixing is continued with stirring, without heating, for 30 minutes and, at the end of this period, a heating step is begun in the course of which the reaction mass is placed under a pressure below atmospheric pressure, of the order of 13 to 40×10² Pa, when the temperature reaches about 80° C.; the heating is continued for 150 minutes until 120° C. is reached, a steady temperature which is then maintained for 120 minutes.

At the end of this period, the heating is stopped and atmospheric pressure is re-established and, when the temperature has fallen to about 65° C., 377 g of the reactive POS defined above are added in 3 portions and blending is continued until this suspension is homogenized.

The viscosity of the suspension obtained is measured:
  using a standard Brookfield viscometer according to the indications of AFNOR standard NFT 76106, and
  using a Carrimed CSL dynamic rheometer, equipped in a cone-plate geometry, working under the following conditions:
    measuring mode: oscillation and controlled stress,
    controlled stress: 3 Pa,
    frequencies: 1 Hz,
    measurement cone-plate geometry: diameter=4 cm, angle=2°.

The ratio of the values of the elastic modulus G' and viscous modulus G", which is representative of the viscoelastic behavior of the suspension, will be presented as results.

2) Preparation of a polycondensation-vulcanizable polyorganosiloxane composition according to the invention, in the form of a two-component system (parts C1 and C2) intended to be placed in contact with each other to give a polycondensation RTV elastomer.

Part C1 (base mixture):
The following ingredients are loaded at room temperature (23° C.) and carefully mixed in a laboratory mixer comprising a 0.5 liter container and a central paddle stirrer:
  235 g of the suspension obtained after phase 1) described above,
  70 g of ground quartz with a particle size of 2.5 μm corresponding to its "d50" median diameter,
  90 g of reactive PS in the form of a hydroxylated polydimethylsiloxane oil blocked at each of the chain ends with a $(CH_3)_2(OH)SiO_{1/2}$ unit having a viscosity of 14,000 mpa·s at 25° C. and containing 0.0646% by weight of hydroxyl radicals,
  1.6 g of reactive POS in the form of a hydroxylated polydimethylsiloxane oil blocked at each of the chain ends with a $(CH_3)_2(OH)SiO_{1/2}$ unit having a viscosity of 40 mPa·s at 25° C. and containing 4.93% by weight of hydroxyl radicals, and
  0.4 g of water.

Part C2 (catalyzed mixture):
This part is obtained by carefully mixing together the following ingredients: polyethyl silicate 40® obtained from the partial hydrolysis of $Si(OC_2H_5)_4$ (87.5% by weight) and di-n-butyltin dilaurate (12.5% by weight).

The RTV composition is obtained by mixing 100 parts by weight of the part C1 with 2 parts by weight of the part C2. The RTV composition is converted by vulcanization after several hours at room temperature (23° C.) into a silicone elastomer; the following mechanical properties are measured after vulcanization for 4 days in a controlled atmosphere at 23° C. and at 50% relative humidity:
  Shore A hardness, denoted SAH (measured according to the indications of DIN standard 53505);
  breaking strength, in MPa, denoted BS, and elongation at break, in %, denoted E/B (measured according to the indications of AFNOR standard NFT 46002);
  tear strength, in N/mm, denoted TS (measured according to the indications of ASTM standard D 624 A).

Example 2

(comparative Example)

1) Preparation of a suspension with introduction of all of the compatibilizer after incorporating the reinforcing filler.

Example 1, phase 1) is repeated, the only difference being that the process begins by loading into the blender 422 g of unreactive POS in the form of a polydimethylsiloxane oil blocked at each of the chain ends with a $(CH_3)_3SiO_{1/2}$ unit having a viscosity of 500 mpa·s at 25° C. and 42 g of water.

After homogenization, 287 g of pyrogenic silica are added portionwise over 180 minutes.

After mixing for 60 minutes, 58 g of hexamethyldisilazane are added over 50 minutes.

Blending is continued for 60 minutes before starting the step in which heating is carried out, followed by heating under reduced pressure and cooling, this step being the same as that previously.

When the temperature has fallen to about 65° C., 279 g of reactive POS, in the form of a hydroxylated polydimethylsiloxane oil blocked at each of the chain ends with a $(CH_3)_2(OH)SiO_{1/2}$ unit having a viscosity of 14 000 mpa·s and containing 0.0646% by weight of hydroxyl radicals, are added in three portions and blending is continued until this suspension is homogenized.

2) Preparation of the polycondensation-vulcanizable two-component polyorganosiloxane composition.

The process is performed exactly as indicated above in Example 1, phase 2).

Example 3

(Comparative Example)

1) Preparation of a suspension with introduction of all of the compatibilizer before incorporating the reinforcing filler.

Example 1, phase 1) is repeated again, the only difference being that the process begins by loading into the blender: 351 g of unreactive POS (viscosity 50 mPa·s), 143 g of reactive POS (viscosity 20 000 mPa·s), 22 g of water and 87 g of hexamethyldisilazane.

After stirring for 30 minutes, 338 g of pyrogenic silica are added portionwise over 180 minutes.

Mixing is continued with stirring for 60 minutes before starting the step in which heating is carried out, followed by heating under reduced pressure and cooling, this step being the same as that previously.

When the temperature has fallen to about 65° C., 377 g of the reactive POS (viscosity 20 000 mPa·s) are added in three portions and blending is continued until this suspension is homogenized.

2) Preparation of the polycondensation-vulcanizable two-component polyorganosiloxane composition.

The process is performed exactly as indicated above in Example 1, phase 2).

The values found, regarding the rheology of the suspensions and the mechanical properties of the elastomers, are collated in the following table:

|  | Rheology of the suspensions | | Mechanical properties of the elastomers | | |
|---|---|---|---|---|---|
|  | Viscosity Pa.s | G'/G" | SAH | BS in MPa | E/B in % | TS in N/mm |
| Example 1 | 120 | 0.60 | 31 | 4.8 | 420 | 27 |
| Example 2 | 65 | 0.70 | 14 | 2.5 | 510 | 15 |
| Example 3 | 145 | 0.85 | 31 | 4.8 | 750 | 24 |

The two-stage treatment (before and after incorporating the reinforcing filler) of the reinforcing filler with the compatibilizer (Example 1) gives a suspension whose rheological behavior is not affected and is typical of a product which flows well, and which allows the preparation of an elastomer with good mechanical properties and, in particular, improved tear strength.

What is claimed is:

1. A process for preparing a suspension of a particulate reinforcing filler treated with a compatibilizer (CA), in a silicone material (SM), said suspension being usable in particular to produce silicone compositions which may be vulcanized or cured by polycondensation, wherein said SM comprises at least one linear reactive POS, having chain ends, bearing at each chain end at least two condensable or hydrolyzable groups, or a single hydroxyl group, said process comprising the steps of:

1) introducing from 8% to 30% by dry weight, relative to the particulate reinforcing filler, of the compatibilizer (CA) into at least a portion of the SM silicone material, and incorporating the particulate reinforcing filler into at least the portion of the SM silicone material, said introduction being carried out before the incorporation or substantially simultaneously with the incorporation, and 2) introducing further compatibilizer (CA) into at least the portion of the SM.

2. The process according to claim 1, wherein SM further comprises at least one linear unreactive POS not bearing a condensable, hydrolyzable or hydroxyl group, and, optionally, water.

3. The process according to claim 2, comprising the following steps:

-1"- homogenizing a mixture comprising some of the reactive POS(s), all of the unreactive POS(s), water, and a first fraction of CA,
   -2- gradually adding the particulate reinforcing filler to the mixture obtained in step -1"-, while mixing,
   -3- continuing mixing without heating,
   -4- gradually introducing a second fraction of CA into the mixture obtained in step -3-, while mixing,
   -5- continuing mixing without heating,
   -6- devolatilizing the mixture,
   -7- optionally, leaving the devolatilized mixture to cool, and
   -8- optionally, completing the suspension with the rest of the POS(s).

4. The process according to claim 1, wherein:

step 1) comprises mixing together in any order, optionally by preparing a premix of the POS(s) with the compatibilizer CA and, optionally, water:
      (100-v-w) parts by weight of at least one reactive POS and, optionally, of at least one unreactive POS,
      0 to 5 parts by weight of water,
      10 to 50 parts by weight of a particulate reinforcing filler, and
      a first fraction of CA representing 8% to 30% of the dry weight of the reinforcing filler,
   step 2) comprises introducing into the mixture a second fraction of CA representing 2% to 25% of the dry weight of the reinforcing filler,
   the process further comprises the following steps of:
      leaving the mixture to react, with continuing mixing,
      heating the mixture, choosing a pressure/temperature couple such that a devolatilization of volatile elements and of at least some of the water which may be present takes place,
      optionally, leaving the devolatilized mixture to cool, and
      optionally, completing the suspension with the rest of reactive POS(s) (v parts by weight) or, with the rest of unreactive POS(s) (w parts by weight),
   the amount of the unreactive POS(s), when this/these is (are) used, is within the range from 1 to 100 parts by weight per 100 parts of the reactive POS(s),
   the total amount of compatibilizer CA is between 10% and 45% of the weight of the reinforcing filler,
   v is a number ranging from zero to 60 parts by weight,
   w is a number ranging from zero to 50 parts by weight, and
   the sum v+w ranges from zero to 60 parts by weight.

5. The process according to claim 1, comprising the following steps:

-1- homogenizing a mixture comprising POS(s), water and a first fraction of CA,
   -2- gradually adding the particulate reinforcing filler to the mixture obtained in step -1-, while mixing,
   -3- continuing mixing without heating,
   -4- gradually introducing a second fraction of CA into the mixture obtained in step -3-, while mixing,
   -5- continuing mixing without heating,
   -6- devolatilizing the mixture,
   -7- optionally, leaving the devolatilized mixture to cool, and
   -8- optionally, completing the suspension with the rest of POS(s).

6. The process according to claim 1, comprising the following steps:

-1'- homogenizing a mixture comprising POS(s) and water,
   -2'- simultaneously gradually incorporating the particulate reinforcing filler and introducing a first fraction of CA, into the mixture obtained in step -1'-, while mixing,
   -3- continuing mixing without heating,
   -4- gradually introducing a second fraction of CA into the mixture obtained in step -3-, while mixing,
   -5- continuing mixing without heating,
   -6- devolatilizing the mixture,
   -7- optionally, leaving the devolatilized mixture to cool, and
   -8- optionally, completing the suspension with the rest of POS(s).

7. The process according to claim 1, wherein the particulate reinforcing filler is a siliceous filler selected from the group consisting of precipitated silicas, pyrogenic silicas, and mixtures thereof, these silicas having a BET specific surface greater than 40 $m^2/g$.

8. The process according to claim 1, wherein the compatibilizer CA is an organosilazane, a cycloorganosilazane, or a mixture thereof, said compatibilizer (CA) being liquid at a temperature of 23° C. and under a pressure of 1 010.8×10² Pa.

9. The process according to claim 1, wherein the reactive POS(s) has the formula (1) below:

(1)

wherein:
R, which is identical or different, is a monovalent hydrocarbon-based group,
Y, which is identical or different, is a hydrolyzable or condensable group, or a hydroxyl group,
n is 1, 2 or 3, provided that n=1 if Y is a hydroxyl group, and
x has a value which is sufficient for the reactive POS(s) of formula (1) to have a dynamic viscosity at 25° C. of between 1000 and 200000 mPa·s.

10. The process according to claim 2, wherein the unreactive POS(s) has the formula (2) below:

(2)

wherein:
R, which is identical or different, is a monovalent hydrocarbon-based group,
y has a value sufficient for the unreactive POS(s) of formula (2) to have a dynamic viscosity at 25° C. of between 10 and 10000 mPa·s.

11. A process for obtaining a polyorganosiloxane composition which may be vulcanized or cured by polycondensation, consisting in mixing together the following products:
-A- a suspension prepared by a process according to claim 1,
-B- optionally, one or more semi-reinforcing, non-reinforcing or bulking filler(s),
-C- optionally, water,
-D- optionally, one or more reactive POS(s), having chain ends, bearing at each chain end at least two condensable or hydrolyzable groups, or a single hydroxyl group,
-E- optionally, one or more reactive POS(s) the formula (1) below:

(1)

wherein:
R, which is identical or different, is a monovalent hydrocarbon-based group,
Y, which is identical or different, is a hydrolyzable or condensable group, or a hydroxyl group,
n is 1, 2 or 3, provided that n=1 if Y is a hydroxyl group, and
x has a value which is sufficient for the reactive POS(s) of formula (1) to have a dynamic viscosity at 25° C. of between 30 and 500 mPa·s,
-F- optionally, one or more unreactive POS(s),
-G- one or more vulcanizing agent(s) selected from the group consisting of:
silanes of general formula (3):

(3)

wherein:
R, which is identical or different, is a monovalent hydrocarbon-based group,
Y', which is identical or different, is a hydrolyzable or condensable group, or a hydroxyl group, and
products of a partial hydrolysis of a silane of formula (3), said product -G- being obligatory if the reactive POS(s) is(are) α,ω-dihydroxylated POS(s), and optional if the reactive POS(s) bear at each chain end condensable groups (other than OH) or hydrolyzable groups,
-H- a polycondensation vulcanization or curing catalyst,
-I- optionally, one or more additive(s) selected from the group consisting of pigments, plasticizers, other rheology modifiers, stabilizers and adhesion promoters.

12. The process according to claim 11, comprising the step of contacting with each other two components C1 and C2 of a system, to obtain a polycondensation RTV elastomer, only one of the C1 or C2 component comprising the catalyst H and, optionally, the vulcanizing agent(s) G.

* * * * *